2,713,076

PRODUCTION OF BENZENE HEXACHLORIDE CONTAINING ENHANCED GAMMA ISOMER CONTENT

Arthur C. Ellsworth, Jr., Paden City, and Fred S. Hirsekorn, New Martinsville, W. Va., assignors to Columbia-Southern Chemical Corporation No Drawing. Application July 30, 1952, Serial No. 301,800

4 Claims. (Cl. 260—648)

This invention relates to a novel process for providing a benzene hexachloride product containing an enhanced content of the gamma isomer thereof.

It is known that benzene hexachloride may be prepared by reaction of benzene with chlorine in the absence of a chlorination substitution catalyst such as ferric or aluminum chloride. The reaction may be facilitated by a variety of catalysts including actinic light, organic peroxides, gamma irradiation or other high frequency electromagnetic radiation, or aqueous alkaline solutions such as NaOH solutions.

At least five isomeric forms of benzene hexachloride are produced by conventional methods of addition chlorination of benzene. These isomers have been designated as alpha, beta, gamma, delta and epsilon. For certain purposes, for example the insecticidal field, it is conventionally recognized that the gamma isomer is of particular value. Accordingly, high gamma isomer contents in the ultimate product is desirable.

Recourse to the various processes known to the art for addition chlorination of benzene results in products containing gamma isomer contents of about 11 to 16 per cent by weight of the benzene hexachloride. The remaining isomers, comprising 84 to 89 per cent of the weight of the product, are of little utility in the insecticidal field. For obvious reasons, it is desirable to obtain products comprising substantially increased percentages of gamma isomer and conversely containing reduced proportions of the less desirable isomers.

The present invention involves a process for providing products containing enhanced gamma isomer contents by separating the gamma isomer from the other products of addition chlorination. It involves chlorinating benzene to form a reaction slurry containing solid benzene hexachloride and having virtually all of the gamma isomer in the liquid phase, raising the temperature of the reaction slurry to dissolve a portion of the solid phase, cooling under carefully controlled conditions to at least precipitate the previously dissolved portion of the solid phase, removing the solid phase, and recovering the gamma rich benzene hexachloride product present in the liquid phase.

The specific operating conditions involved in the practice of this invention may be varied widely according to certain generalizations. Thus, chlorination is carried out at least until solid benzene hexachloride precipitates to provide a reaction slurry. Preferably, chlorination is continued until the liquid phase of the reaction slurry is virtually saturated with the gamma isomer and/or until precipitation of the gamma isomer commences. The exact degree of chlorination at which gamma saturation of the liquid phase is reached and/or the gamma isomer will precipitate varies with the temperature and composition of solvent, as well as the relative percentage of the gamma isomer in the reaction product. Although it is preferable to conduct chlorination such that all of the gamma isomer remains in the liquid phase of the reaction slurry, the invention may be practiced if substantially all of the gamma isomer remains dissolved, such as when 80 per cent, or more, by weight of all the gamma isomer is present in the liquid phase. Thus, if less than 20 per cent by weight of the gamma isomer is in the solid phase, it may be said that virtually all of the gamma isomer is in the liquid phase for purposes of this invention.

Precipitation of the gamma isomer occurs at a higher degree of benzene conversion than when solids initially precipitate in the reaction mixture. As chlorination proceeds, the alpha and beta isomers are the first to saturate the liquid phase and precipitate to form a solid phase. The gamma isomer is more soluble, and chlorination may be continued, in the practice of this invention, until the gamma isomer begins to precipitate.

The temperature of this reaction slurry is then raised to dissolve at least a small portion of the solid phase. A minimum of 2 per cent by weight of the solid phase is redissolved. It is to be understood that any amount in excess of 2 per cent by weight of the solid phase may be dissolved in this step. The entire solid phase may therefore be dissolved.

This heating step may be satisfactorily practiced by employing a variety of heating techniques and temperatures. The temperature may be rapidly raised and maintained at the elevated temperature until the appropriate amount of solid has been dissolved. Alternatively, the temperature may be raised gradully, in which case, the holding period is unnecessary or substantially reduced.

After the appropriate amount of solid phase is dissolved, the reaction mixture is gradually cooled under carefully controlled conditions to a temperature which is above the temperature at which the gamma isomer will precipitate. Preferably, the final temperature of the cooled reaction mixture is just at, or slightly above the temperature at which the gamma isomer will commence precipitating. However, as long as the slurry is cooled sufficiently to reprecipitate the previously dissolved solids, satisfactory results accrue. Cooling below the temperature at which the gamma isomer precipitates will decrease the amount of gamma isomer that may be recovered. Accordingly, the reaction mixture is cooled to at least reprecipitate the amount of solids dissolved in the heating step, but not below the temperature at which any substantial amount of gamma isomer will precipitate. A reaction mixture which is cooled to the point at which less than 20 per cent by weight of the gamma isomer is precipitated is satisfactory. Preferably, cooling is conducted under quiescent conditions, or with mild agitation.

Cooling is performed at a rate between 2° C. and 12° C. per hour until the desired temperature is reached. Slower cooling rates are just as satisfactory, but in general unduly prolong the operation. Thus, rates such as 1° C., or less, per hour, are operable. If the rate of cooling exceeds 12° C. per hour, less efficient results are obtained. However, it is imperative to avoid shock cooling, or any abrupt temperature reductions. Rates substantially in excess of 12° C. per hour, i. e., 15° C. per hour or above, provide results similar to shock cooling. Conveniently, the cooling is accomplished in a substantially uniform, continuous manner, although such is not essential if the rate of cooling is maintained within the above enumerated range.

Separation of the solid and liquid phases is effected by resort to various well known mechanical means, for example, centrifugation or filtration. The mother liquor is then treated to recover the benzene hexachloride dissolved therein. This recovery may be achieved by distillation of benzene at atmospheric pressure or subatmospheric pressure. Other known techniques may also be utilized.

While heretofore it has been recognized that it is possible to chlorinate benzene, remove the solids and recover benzene hexachloride from the remaining solution, such method has not been entirely satisfactory. Among the disadvantages of such a process has been the problem of removing the solids, particularly on a large scale, under commercially practicable conditions. For example, the time required to centrifuge a 1500 gallon batch of reaction mixture has entailed a continuous operation of at least 30 hours.

Employing the same separation equipment in the practice of this invention wherein the reaction slurry has been subjected to the aforedescribed chlorination and temperature controls, only 10 to 15 hours are required to separate the solids from the slurry. A reduction of between 50 to 67 per cent in the time necessary to centrifuge the slurry is thereby achieved.

A further advantage realized by practice of these particular chlorination and temperature controls is the attainment of a superior product. As far as is known, the solid components of the reaction mixture comprise essentially the alpha and beta isomers, with the solution containing mostly all of the prepared gamma, delta and epsilon isomers. However, a certain amount of the mother liquor, containing some gamma isomer is normally inseparable from the filtered solids. By recourse to the controlled chlorination, heating and cooling steps of this invention, the amount of mother liquor that is inseparable from the solid phase is materially reduced, and a final product containing high gamma isomer concentrations is produced.

The invention may be practiced by resort to various specific procedures. For example, gaseous or liquid chlorine may be reacted with benzene while irradiating with actinic light at temperatures above the freezing point of benzene up to as high as about 70° C. usually between 10° C. and 40° C., until from about 40 to 60 per cent by weight of the benzene has been converted to benzene hexachloride. At the conclusion of chlorination at 25° C., for example, when about 45 per cent by weight of benzene has been converted, the temperature of the reaction mixture is raised to about 51.5° C. and held there for one to two hours. The reaction mixture is then cooled gradually, at the rate of 4° C. to 10° C. per hour until a temperature of between 10° C. and 20° C. is attained. At this temperature, the solid benzene hexachloride is separated by any convenient expedient, for example, filtration or centrifugation, leaving a solution containing a predominant amount of gamma isomer. Excess benzene may be removed from the solution, by vacuum distillation, for example. A product containing at least from 40 to 45 per cent by weight of gamma isomer is always obtained.

This invention is equally applicable to use with slurries resulting from any method of chlorinating benzene to produce benzene hexachloride. For example, chlorine may be added to a reaction mixture comprising benzene and a solvent, while irradiating with actinic light. Depending on the particular solvent, this process may be carried out at temperatures between minus 100° C. and plus 80° C. At temperatures below the freezing point of benzene, the solvent must be such that in proper portions with the benzene it will provide a liquid reaction mixture. Several such solvents include carbon tetrachloride, dichlorodifluoromethane and the like.

Moreover, the chlorination of benzene at low temperatures such as from plus 5° C. to minus 100° C. may be practiced by recourse to a special group of solvents under carefully controlled reaction conditions. Gaseous or liquid chlorine may be reacted with a liquid reaction mixture of benzene and a solvent such as chloroform, ethylene dichloride, methyl chloride, methylene dichloride or methyl chloroform while maintaining the chlorine concentration in the reaction mixture between about 0.005 and 2.0 per cent by weight of the reaction mixture. In general, these solvents are partially halogenated or chlorinated aliphatic hydrocarbons containing 1 to 4 carbon atoms wherein one carbon atom is linked to a hydrogen and a halogen atom. Using the slurries resulting from this process, it is possible to prepare products containing upwards of 50 per cent by weight of gamma isomer.

This invention is accordingly useful with the reaction slurries resulting from chlorination process described in application Serial No. 250,115 to Pechukas et al. filed October 6, 1951 wherein solvents such as dichlorodifluoromethane are employed. It is also applicable when employed to selectively separate the isomers from the reaction slurries resulting from the process taught in application Serial No. 225,854 to Neubauer et al., filed May 11, 1951, now abandoned, describing the use of partially halogenated aliphatic hydrocarbons as solvents in a low temperature process.

While the invention has been described with reference to addition chlorination processes wherein actinic light is employed as the catalyst it is applicable to reaction slurries resulting from addition chlorination of benzene regardless of the particular catalyst employed. Slurries resulting from processes wherein catalysis is provided by organic peroxides such as those described in application Serial No. 15,486 to Franklin Strain et al. filed March 17, 1948, now abandoned, peroxydicarbonate esters such as those shown in application Serial No. 15,497 to Franklin Strain, et al. filed March 17, 1948, now abandoned, gamma radiation or other high frequency electromagnetic radiation, or aqueous alkali solutions such as sodium hydroxide solutions in lieu of or in cooperation with actinic radiation, or in any combination with one another, are within the contemplation of this invention.

The invention may be illustrated by reference to the following example, although it is not intended to be limited thereto.

*Example*

Chlorination of a 1500 gallon batch of benzene in a nickel lined, jacketed reactor containing cooling coils was carried out by introducing gaseous chlorine into the benzene until a specific gravity of 1.4 (equivalent to a conversion of 45 per cent by weight of the benzene charge), was attained while maintaining the temperature at 24–25° C.

During the chlorine introduction the reaction mixture was irradiated with two 4500 watt lamps in glass thimbles within the reactor. Cooling was provided by circulating brine in the jacket and coils. A chlorine concentration of from 0.5 to 0.6 per cent by weight of the slurry was maintained in the reaction mixture. During the course of the reaction, the reaction mixture was continuously agitated. The reaction was carried out under atmospheric pressure.

At the conclusion of the chlorine addition, the refrigeration was discontinued with irradiation continued and the temperature of the slurry was permitted to rise from 25° C. to 51.5° C. by virtue of the heat of reaction, at which latter temperature it was maintained for between 1 to 2 hours. After this holding period, the slurry was transferred to a slurry holding tank and cooled in 4 to 7 hours at a constant rate to a temperature of between 15° C. and 19° C.

The slurry was then transferred to Baker-Perkins automatic batch centrifuge and the solid phase was separated in from 10 to 15 hours. The temperature at separation was maintained between 15° C. and 19° C. by cooling.

The solution, minus the solids removed by centrifugation, was then distilled at atmospheric temperature until the benzene distillation rate dropped. Distillation was then carried out at between 10 to 20 millimeters mercury pressure and 140° C. to remove the remaining benzene. The molten product was then cooled to 65° C. and run into shipping drums.

In practice of the above example, the chlorine concentration may be varied from 0.3 to 0.8 per cent by weight of the slurry. The optimum concentration is between 0.5 and 0.6 per cent by weight of the reaction slurry at 24° C.

or 25° C. The chlorination temperature may be varied from 18° C. to 30° C. At lower temperatures, the lower chlorine concentrations are more suitable while at the higher temperatures the higher chlorine concentrations are preferred.

Although the invention has been described with reference to specific details of certain embodiments thereof, it is not intended that such details be regarded as limitations upon the scope of the invention except insofar as included in the accompanying claims.

What is claimed is:

1. A method of producing benzene hexachloride containing an enhanced gamma isomer content which comprises additively chlorinating benzene in the liquid phase at a temperature of up to about 70° C. until a reaction slurry is formed which contains solid benzene hexachloride but wherein virtually all of the gamma isomer is in the liquid phase, raising the temperature of the slurry above the temperature at which the slurry is formed to dissolve at least about 2 per cent by weight of the solid phase, cooling the slurry at a rate not in excess of 12° C. per hour until at least the said dissolved solids are reprecipitated but not below the temperature at which any substantial amount of gamma isomer will precipitate, mechanically removing the solid phase from the cooled slurry and recovering gamma enriched benzene hexachloride from the liquid phase.

2. A method of producing benzene hexachloride containing an enhanced gamma isomer content which comprises additively chlorinating benzene in the liquid phase at a temperature up to about 70° C. until a reaction slurry is formed which contains solid benzene hexachloride but wherein virtually all of the gamma isomer is in the liquid phase, raising the temperature of the slurry above the temperature at which the slurry is formed to the point where at least 2 per cent by weight of the solid benzene hexachloride is dissolved, cooling the slurry at a rate not in excess of 12° C. per hour until at least the said dissolved solids are reprecipitated and to a point at which less than 20 per cent by weight of the gamma isomer will precipitate, mechanically removing the solid phase from the cooled slurry and recovering gamma enriched benzene hexachloride from the liquid phase.

3. The method of claim 2 wherein the slurry is cooled at a rate of between 2° C. and 12° C. per hour.

4. The method of claim 2 wherein the solid phase is removed from the cooled slurry by centrifugation.

References Cited in the file of this patent

UNITED STATES PATENTS

| | | |
|---|---|---|
| 2,569,677 | La Lande et al. | Oct. 2, 1951 |

FOREIGN PATENTS

| | | |
|---|---|---|
| 125,285 | Sweden | June 28, 1949 |
| 637,732 | Great Britain | May 24, 1950 |
| 646,917 | Great Britain | Nov. 29, 1950 |
| 655,686 | Great Britain | Aug. 1, 1951 |
| 659,810 | Great Britain | Oct. 31, 1951 |